United States Patent Office 2,826,572
Patented Mar. 11, 1958

2,826,572
CHROMIUM CONTAINING AZO DYESTUFFS

Werner Kuster and Guido Schetty, Basel, Switzerland, assignors to J. R. Geigy A. G., Basel, Switzerland, a Swiss firm No Drawing. Application July 12, 1954
Serial No. 442,904
Claims priority, application Switzerland July 20, 1953
6 Claims. (Cl. 260—145)

The present invention concerns a process for the production of monoazo dyestffs, containing chromium in complex linkage, which contain no acid water solubilizing groups. In particular it is concerned with the production of o,o'-dihydroxyazo dyestuffs, containing chromium, of the type $(F_1-M_1-F_2)M_2$, wherein $F_1$ and $F_2$ represent the same or different o,o'-dihydroxyazo dyestuffs of the 5-pyrazolone series, $M_1$ represents a chromium atom and $M_2$ represents the equivalent of a cation, in particular a monovalent alkali cation. The new red chromium containing dyestuffs are suitable for the fast dyeing of natural and synthetic polypeptide fibres from a neutral to weakly acid bath, and they give wool dyeings which in particular are fast to light and also rubbing. The invention therefore enables valuable red dyestuffs to be produced which, because of their good drawing power and their high fastness to light, can be combined in any manner desired when dyeing with other dyestuffs of this class to produce fast fashionable shades on wool.

The known monoazo dyestuffs from nitrated o-hydroxy-aminobenzene compounds and 1-phenyl-3-methyl-5-pyrazolones containing chromium bound in complex linkage and a sulphamide group, $-SO_2-NH_2$ in the phenyl radical as a substituent which favourably affects the water solubility, generally have an insufficient drawing power on to wool in a neutral dyebath and as a result, they are often unfavourable when dyeing in combination with other types of this class of dyestuffs. Depending on the composition, their wool dyeings are also often not very fast to light.

It has now been found that very fast to light complex chromium compounds of monoazo dyestuffs which draw well on to wool even from a neutral bath, are obtained if a monoazo dyestuff of the general Formula I and a monoazo dyestuff of the general Formula II

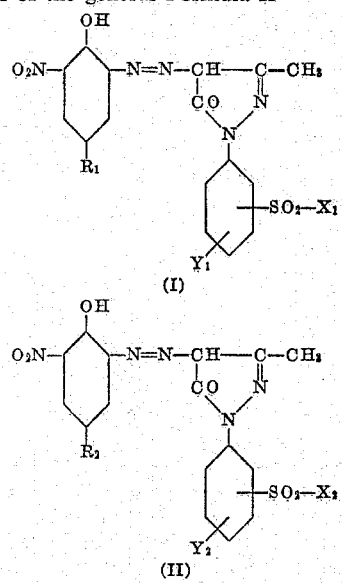

which contain no acid water solubilising groups such as e. g. sulphonic acid or carboxyl groups, are reacted with agents giving off chromium in such amounts that there are two dyestuff molecules linked with one chromium atom.

In these formulae: $R_1$ represents an alkyl or cyclo-alkyl radical with 4-8 carbon atoms, $R_2$ represents an alkyl radical with 1-5 carbon atoms or chlorine, $X_1$ and $X_2$ represent the $-CH_3-$, $-NH_2$, $-NHCH_3$ or $-NHC_2H_4OH$ group, and $Y_1$ and $Y_2$ represent H, $-CH_3$ or Cl.

Dyestuffs of the general Formula I usable according to the present invention are obtained, e. g. from the following diazo components: 4-n-butyl-, 4-tert. butyl-, 4-n-amyl-, 4-tert. amyl-, 4-cyclohexyl- or 4-octyl-6-nitro-2-amino-1-hydroxybenzene.

As azo components such 1-phenyl-3-methyl-5-pyrazolones can be used with are substituted in the phenyl radical, preferably in the 3- or 4-position by, for example a sulphonic acid amide, methyl amide, ethanol amide group or by a methyl sulphonyl group and which may contain also methyl or chlorine substituents in the 4- or 6-position for example.

Suitable monoazo dyestuffs of the general Formula II which can be used according to the present invention are obtained from the following diazo components: 4-methyl-, 4-isopropyl-, 4-n-butyl-, 4-tert. butyl-, 4-n-amyl- or 4-tert. amyl-6-nitro-2-amino-hydroxybenzene. As coupling components the 3-methyl-5-pyrazolone compounds listed above as suitable for the production of the monoazo dyestuff I can be used.

The new complex chromium compounds correspond to the formula $(F_1-Cr-F_2)M$ wherein $F_1$ and $F_2$ represent dyestuffs of the general Formula I and II and M represents an alkali metal cation. A sufficient water solubility of the complex chromium compounds however is only attained if a strongly hydrophilic group, e. g. the sulphamide group $-SO_2NH_2$ is chosen as the solubility promoting substituent. Experience shows that this sulphamide group as substituent in the benzene ring of the coupling component in symmetrical complex chromium compounds of monoazo dyestuffs obtained from the usual diazo components and 1-phenyl-3-methyl-5-pyrazolones, too strongly reduces the drawing power onto wool from a neutral bath. It is therefore often of advantage to combine a dyestuff of the Formula I, the metal complex of which has too little water solubility, with an easily water soluble dyestuff of the Formula II, the metal complex of which has not sufficient drawing power from a neutral bath. In this way, sufficiently soluble mixed chromium complex compounds which draw well from a neutral bath are obtained. For example, it is of advantage to combine a dyestuff of the Formula I having an alkyl radical $R_1$ which contains from 4 to 8 carbon atoms with a dyestuff of the Formula II which as substituent $R_2$ has a low molecular alkyl radical, preferably the methyl group. A process which is particularly advantageous technically consists in reacting a diazo compound corresponding to the dyestuff I and a diazo compound corresponding to the dyestuff II with the same coupling component to produce a dyestuff mixture and then to treat this with agents yielding chromium. The following suitable combinations for example can be named: 6-nitro-4-methyl-2-amino-1-hydroxybenzene and 6-nitro-4-tert. butyl- or tert. amyl-2-amino-1-hydroxybenzene diazotised and coupled with 1-(3'- or 4'-sulphonic acid amidophenyl)-3-methyl-5-pyrazolone or with 1-(6'-chloro- or -methyl-3'-sulphonic acid-amidophenyl)-3-methyl-5-pyrazolone or 1-(4'-chloro- or -methyl-3'-sulphonic acid amidophenyl)-3-methyl-5-pyrazolone or with corresponding sulphonic acid methyl amide, or sulphonic acid methylethanolamide compounds.

The invention however, is not limited to such very similar combinations; less similar mixtures of metallisable pyrazolone dyestuffs can produce valuable chromium containing dyestuffs.

The pyrazolone dyestuffs usable according to the present invention are chromed either in aqueous solution or suspension or in the presence of organic solvents or solubility promoters such as lower alcohols, ether alcohols or fatty acid amides. The process is performed at a raised temperature, if desired under pressure. Chiefly the salts or also the hydroxides of chromium can be used as agents yielding chromium. The use of salts of weak acids is advantageous, e. g. of organic carboxylic acid or the reaction is performed with the mineral acid salts of chromium in the presence of agents neutralising the mineral acid such as sodium acetate. If necessary, also the complex chromium salts can be used with advantage, e. g. the alkali salts of chromosalicylic acid. In any case, a mineral acid reaction of the medium in the final stage of the metallisation is to be avoided. Of the agents yielding chromium, such amounts are used that there is at least one chromium atom to two dyestuff molecules. If necessary the metallised dyestuffs are finally converted by the action of alkalies or alkaline salts such as sodium or potassium carbonate into the alkali salts. In the production of mixed complexes, the amount of dyestuff I and II does not necessarily have to be stoichiometrical.

In lacquer dyestuffs it is advantageous that the cation of the complex dyestuff-chromium compound be either hydrogen or an organic amine, in textile dyestuffs an alkali or the ammonium cation.

The alkali salts of the new complex chromium compounds are obtained as blue-red powders. Sometimes it may be of advantage to mix them with slight amounts of salts having an alkaline reaction such as sodium carbonate or trisodium phosphate and with anion active wetting and dispersing agents such as soap or synthetic washing agents. They then dissolve in hot water with a bluish-red colour and they dye wool from a neutral to weakly acid bath in fast to light red shades. They are distinguished from similar known compounds by their greater affinity to polypeptide fibres in a neutral to weakly acid bath while at the same time having sufficient water solubility.

The following examples illustrate the invention without limiting it in any way. Where not otherwise stated, parts are given as parts by weight and the temperatures are in degrees centigrade. The relationship of parts by weight to parts by volume is as that of kilogrammes to litres.

EXAMPLE 1

22.4 parts of 6-nitro-4-tert. amyl-2-amino-1-hydroxybenzene and 4 parts of sodium hydroxide are dissolved in 200 parts of water, 6.9 parts of sodium nitrite in 35 parts of water are added and the whole is added dropwise at a temperature not exceeding 5° to 25 parts by volume of concentrated hydrochloric acid and 100 parts of water. A yellowish-green suspension of the diazo compound is obtained. On completion of the diazotisation, the acidity of the diazo suspension is neutralised with sodium bicarbonate until Congo red paper is no longer coloured blue, whereupon a solution of 27.2 parts of 1-(4'-methyl-3'-sulphamidophenyl)-3-methyl-5-pyrazolone and 7 parts of sodium hydroxide in 200 parts of water is added. The temperature is then raised overnight from 5° to 20°, after which the completely formed dyestuff can be filtered off direct; it is well washed with 5% sodium chloride solution.

The filter cakes of this dyestuff are then pasted in 1000 parts of water and 10 parts of ammonia 25% and 100 parts of a solution of ammonium disalicylato chromate containing 3% (by volume) of chromium are added and the whole is heated at 95–100° for 6–8 hours. 50 parts of sodium chloride are then added, the almost completely precipitated complex chromium compound is filtered off at 80°, washed with 5% sodium chloride solution and dried.

The chromium containing dyestuff is a bluish-red powder which dissolves in hot water with a red and in concentarted sulphuric acid with a yellow-brown colour. It dyes wool from a neutral to weakly acid bath in pure bluish-red shades which have very good fastness properties, in particular good fastness to light.

Very similar dyestuffs are obtained if in the above example the diazo component is replaced by 21.0 parts of 6-nitro-4-tert. butyl-2-amino-1-hydroxybenzene or the coupling component is replaced by 25.8 parts of 1-(3'-sulphamidophenyl)-3-methyl-5-pyrazolone or 25.8 parts of 1-(4'-sulphamidophenyl)-3-methyl-5-pyrozolone or 27.2 parts of 1-(4'-sulphomethylamido-phenyl)-3-methyl-5-pyrazolone or 30.3 parts of 1-(4'-sulfethanolamidophenyl)-3-methyl-5-pyrazolone or 27.2 parts of 1-(2'-methyl-5'-sulphamido - phenyl)-3-methyl-5-pyrazolone or 30.3 parts of 1-(4'-chloro-3'-sulphamido-phenyl)-3-methyl-5-pyrazolone.

EXAMPLE 2

22.4 parts of 6-nitro-4-tert. amyl-2-amino-1-hydroxybenzene are diazotised as described in Example 1. On completion of the diazotisation, the suspension of the diazonium compound is neutralised with sodium bicarbonate until Congo red paper is no longer coloured blue. A solution of 26 parts of 1-(4'-methyl-sulphonyl-phenyl)-3-methyl-5-pyrazolone and 4.1 parts of sodium hydroxide in 200 parts of water is then added and the temperature of the coupling mixture is raised from 3° to 20° within 10 hours, whereupon the dyestuff is filtered off and washed with 5% sodium chloride solution.

The filter cakes are then pasted in 1000 parts of water with 10 parts of ammonia 25% at 80°, 100 parts by volume of a solution of ammonium disalicylato chromate, containing 3% (by volume) of chromium, is added and the whole is heated for 6–8 hours at 95–100°. 50 parts of sodium chloride are then added, the completely precipitated complex chromium compound is filtered off, washed with 5% sodium chloride solution and dried.

The chromium containing dyestuff is a bluish-red powder which dissolves in water with a red and in concentrated sulphuric acid with a brown-yellow colour. It dyes wool from a neutral to weakly acid bath in bluish-red shades. The dyeings have very good fastness properties, in particular a very good fastness to light.

Very similar dyestuffs are obtained if in the above example the diazo component is replaced by 21.0 parts of 6-nitro-4-tert. butyl-2-amino-1-hydroxybenzene or the coupling component is replaced by 26 parts of 1-(3'-methylsulphonyl-phenyl)-3-methyl-5-pyrazolone or by 27 parts of 1-(2'-methyl-5'-methyl sulphonyl-phenyl)-3-methyl-5-pyrazolone or by 29.5 parts of 1-(2'-chloro-5'-methylsulphonyl-phenyl)-3-methyl-5-pyrazolone.

EXAMPLE 3

Chromium containing dyestuffs which contain two different monoazo dyestuffs can be produced as follows:

The filter cakes of the monoazo dyestuffs I and II which can both be produced as described in Example 1 from:

I. 22.4 parts of 6-nitro-4-tert. amyl-2-amino-1-hydroxybenzene and 27.4 parts of 1-(3'-sulphamido-4'-methylphenyl)-3-methyl-5-pyrazolone, and II. 16.8 parts of 6-nitro-4-methyl-2-amino-1-hydroxybenzene and 27.4 parts of 1-(3'-sulphamido-4'-methylphenyl)-3-methyl-5-pyrazolone, are pasted in 2000 parts of water and 20 parts of ammonia 25%. 200 parts of a solution of ammonium disalicylato chromate, containing 3% (by volume) of chromium, are added at 80°. The whole is stirred for 6–8 hours at 95–100° and then the chromed dyestuff mixture is precipitated by the addition of 250 parts of sodium chloride. It is filtered off, washed with 5% sodium chloride solution and dried.

The chromium containing dyestuff is a bluish-red powder which dissolves in water with a red, in concentrated sulphuric acid with a yellow-brown colour. The water solubility of the mixed complex is greater than that of the uniform complex chromium compounds of the dyestuffs I and II and the fastness to light is considerably better than that of the uniform chromium complex obtained from dyestuff II. The mixed complex dyes wool from a neutral to weakly acid bath in bluish-red shades which have very good fastness properties.

EXAMPLE 4

To produce the monoazo dyestuff I, 23.6 parts of 6-nitro-2-amino-4-cyclohexyl-1-hydroxybenzene and 4 parts of sodium hydroxide are dissolved in 200 parts of water, 6.9 parts of sodium nitrate in 35 parts of water are added and the mixture is added dropwise at a temperature not exceeding 5° to 25 parts by volume of concentrated hydrochloric acid and 100 parts of water. In this way, a yellowish-green suspension of the diazo body is obtained. On completion of the diazotisation, the acidity of the diazo suspension is neutralised with sodium bicarbonate until congo paper is no longer coloured blue, whereupon a solution of 25.8 parts of 1 - (3' - sulphamidophenyl) - 3-methyl-5-pyrazolone and 7 parts of sodium hydroxide in 200 parts of water are added. The temperature is allowed to rise overnight at 20° and then the completely formed dyestuff can be filtered off direct. It is washed well with a 5% sodium chloride solution.

The monoazo dyestuff II is produced in the same manner by diazotising 16.8 parts of 6-nitro-2-amino-4-methyl-1-hydroxybenzene and coupling with 25.8 parts of 1-(3'-sulphamidophenyl)-3-methyl-5-pyrazolone.

The filter cakes of both dyestuffs are pasted together in 2000 parts of water and 20 parts of 25% ammonia. 200 parts of a solution of ammonium disalicylatochromate, which contains 3% by volume of chromium, are added at 80°. The whole is stirred for 6-8 hours at 95-100° and then the chromed dyestuff mixture is separated by the addition of 200 parts of sodium chloride. It is filtered off, washed with 5% sodium chloride solution and dried.

The chromium containing dyestuff is a bluish powder which dissolves in water with a red, in concentrated sulphuric acid with a yellow-brown colour. Compared with the uniform chromium compounds of the dyestuffs I and II, the mixed complex has an increased water solubility and in contrast with the uniform chormium complex from dyestuff II it has considerably better fastness to light. The mixed complex dyes wool from a neutral to weakly acid bath in bluish-red shades which have very good fastness propoerties.

Very similar mixed complexes are obtained if, in the above example, the dyestuffs I and II are replaced by the dyestuffs shown under I and II in the following table.

*Table*

| No. | Monoazo dyestuff I | Monoazo dyestuff II | Metal | Wool dyeing |
|---|---|---|---|---|
| 1 | 47.4 parts of dyestuff from 6-nitro-4-tert. butyl-2-amino-1-hydroxybenzene → 1-(3'-sulphamidophenyl)-3-methyl-5-pyrazolone. | 48.8 parts dyestuff from 6-nitro-4-tert. amyl-2-amino-1-hydroxybenzene → 1-(3'-sulphamidophenyl)-3-methyl-5-pyrazolone. | Cr | Bluish red. |
| 2 | ----do---- | 45.25 parts dyestuff from 6-nitro-4-chloro-2-amino-1-hydroxybenzene → 1-(3'-sulphamidophenyl)-3-methyl-5-pyrazolone. | Cr | Do. |
| 3 | ----do---- | 44.6 parts of dyestuff from 6-nitro-4-methyl-2-amino-1-hydroxybenzene → 1-(4'-methyl-3'-sulphamidophenyl)-3-methyl-5-pyrazolone. | Cr | Do. |
| 4 | ----do---- | 43.1 parts of dyestuff from 6-nitro-4-methyl-2-amino-1-hydroxybenzene → 1-(4'-methylsulphonylphenyl)-3-methyl-5-pyrazolone. | Cr | Do. |
| 5 | ----do---- | 47.4 parts dyestuff from 6-nitro-4-tert. butyl-2-amino-1-hydroxybenzene → 1-(4'-methyl-3'-sulphamidophenyl)-3-methyl-5-pyrazolone. | Cr | Do. |
| 6 | 47.3 parts dyestuff from 6-nitro-4-tert. butyl-2-amino-1-hydroxybenzene → 1-(4'-methylsulphonylphenyl)-3-methyl-5-pyrazolone. | ----do---- | Cr | Do. |
| 7 | ----do---- | 43.1 parts dyestuff from 6-nitro-4-methyl-2-amino-1-hydroxybenzene → 1-(3'-methylsulphonylphenyl)-3-methyl-5-pyrazolone. | Cr | Do. |
| 8 | 50.2 parts dyestuff from 6-nitro-4-tert. amyl-2-amino-1-hydroxybenzene → 1-(4'-methyl-3'-sulphamidophenyl)-3-methyl-5-pyrazolone. | ----do---- | Cr | Do. |
| 9 | ----do---- | 43.2 parts dyestuff from 6-nitro-4-methyl-2-amino-1-hydroxybenzene → 1-(3'-sulphamidophenyl)-3-methyl-5-pyrazolone. | Cr | Do. |
| 10 | ----do---- | 44.6 parts dyestuff from 6-nitro-4-methyl-2-amino-1-hydroxybenzene → 1-phenyl-3-methyl-5-pyrazolone-3'-sulphonic acid methylamide. | Cr | Do. |
| 11 | 50 parts dyestuff from 6-nitro-4-cyclohexyl-2-amino-1-hydroxybenzene → 1-phenyl-3-methyl-5-pyrazolone-3'-sulphamide. | 44.6 parts dyestuff from 6-nitro-4-methyl-2-amino-1-hydroxybenzene → 1-(4'-methyl-3'-sulphamidophenyl)-3-methyl-5-pyrazolone. | Cr | Do. |
| 12 | ----do---- | 43.2 parts dyestuff from 6-nitro-4-methyl-2-amino-1-hydroxybenzene → 1-(4'-methyl-3'-sulphamidophenyl)-3-methyl-5-pyrazolone. | Cr | Do. |
| 13 | ----do---- | 47.3 parts dyestuff from 6-nitro-4-tert. amyl-2-amino-1-hydroxybenzene → 1-(3'-sulphamidophenyl)-3-methyl-5-pyrazolone. | Cr | Do. |
| 14 | ----do---- | 44.6 parts dyestuff from 6-nitro-4-methyl-2-amino-1-hydroxybenzene → 1-(3'-sulphmethylamidophenyl)-3-methyl-5-pyrazolone. | Cr | Do. |
| 15 | 54.4 parts dyestuff from 6-nitro-4-cyclohexyl-2-amino-1-hydroxybenzene → 1-phenyl-3-methyl-5-pyrazolone-3'-sulphethanolamide. | 51.8 parts dyestuff from 6-nitro-4-tert. butyl-2-amino-1-hydroxybenzene → 1-(3'-sulphethanolamidophenyl)-3-methyl-5-pyrazolone. | Cr | Do. |
| 16 | 53 parts dyestuff from 6-nitro-4-octyl-2-amino-1-hydroxybenzene → 1-phenyl-3-methyl-5-pyrazolone-3'-sulphamide. | 43.2 parts dyestuff from 6-nitro-4-methyl-2-amino-1-hydroxybenzene → 1-(3'-sulphamidophenyl)-3-methyl-5-pyrazolone. | Cr | Do. |
| 17 | ----do---- | 51.8 parts dyestuff from 6-nitro-4-tert. butyl-2-amino-1-hydroxybenzene → 1-(3'-sulphethanolamidophenyl)-3-methyl-5-pyrazolone. | Cr | Do. |
| 18 | 54.4 parts dyestuff from 6-nitro-4-octyl-2-amino-1-hydroxybenzene → 4'-tolyl-3-methyl-5-pyrazolone-3'-sulphamide. | 44.6 parts dyestuff from 6-nitro-4-methyl-2-amino-1-hydroxybenzene → 1-(4'-methyl-3'-sulphamidophenyl)-3-methyl-5-pyrazolone. | Cr | Do. |
| 19 | 53 parts dyestuff from 6-nitro-4-octyl-2-amino-1-hydroxybenzene → 1-phenyl-3-methyl-5-pyrazolone-4'-sulphamide. | ----do---- | Cr | Do. |
| 20 | ----do---- | 43.1 parts dyestuff from 6-nitro-4-methyl-2-amino-1-hydroxybenzene → 1-(4'-methylsulphonylphenyl)-3-methyl-5-pyrazolone. | Cr | Do. |
| 21 | 48.8 parts dyestuff from 6-nitro-4-tert. amyl-2-amino-1-hydroxybenzene → 1-(3'-sulphamidophenyl)-3-methyl-5-pyrazolone. | 43.2 parts dyestuff from 6-nitro-4-methyl-2-amino-1-hydroxybenzene → 1-(3'-sulphamidophenyl)-3-methyl-5-pyrazolone. | Cr | Do. |
| 22 | ----do---- | 45.25 parts dyestuff from 6-nitro-4-chloro-2-amino-1-hydroxybenzene → 1-(3'-sulphamidophenyl)-3-methyl-5-pyrazolone. | Cr | Do. |

EXAMPLE 5

10 parts of wool are entered at 40° into a solution of 0.2 part of the chromium containing dyestuff according to example 1 in 400 parts of water containing 0.3 part of ammonium acetate. The bath is brought to the boil within 30 minutes and boiling is continued until it is practically exhausted which is the case after another 30 minutes. The wool which has been dyed a strong bluish-red colour is rinsed and dried.

What we claim is:

1. A complex chromium compound of the general formula:

$$(F\!-\!Cr\!-\!F')\!-\!M$$

wherein M is a cation and F is a co-ordinated monoazo dyestuff of the formula:

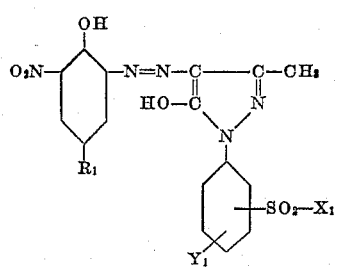

and F' is a co-ordinated monoazo dyestuff of the formula:

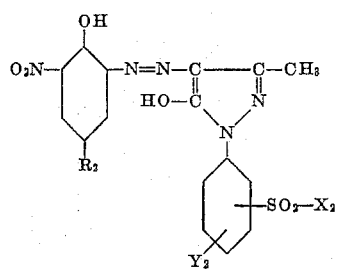

wherein $R_1$ represents a saturated hydrocarbon radical with from 4 to 8 carbon atoms, $R_2$ represents a member selected from the group consisting of alkyl radicals with 1 to 5 carbon atoms and chlorine, $X_1$ and $X_2$ represent a member selected from the group consisting of $CH_3$, $NH_2$, $NHCH_3$ and $NHC_2H_4OH$ and $Y_1$ and $Y_2$ represent a member selected from the group consisting of H, $CH_3$ and Cl.

2. A complex chromium compound of the formula $$(F\!-\!Cr\!-\!F')M$$

wherein M is a cation and F is a co-ordinated monoazo dyestuff of the formula

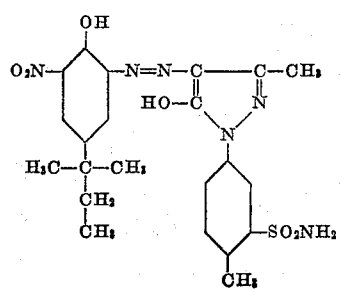

and F' is a co-ordinated monoazo dyestuff of the formula

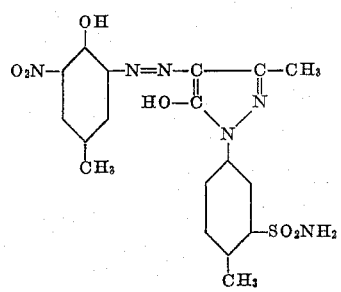

3. A complex chromium compound of the formula $$(F\!-\!Cr\!-\!F')M$$

wherein M is a cation and F and F' are co-ordinated monoazo dyestuffs of the formula

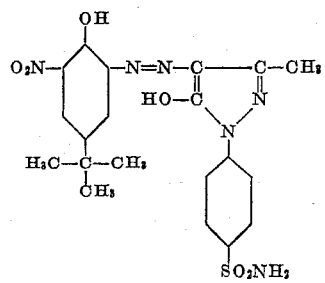

4. A complex chromium compound of the formula $$(F\!-\!Cr\!-\!F')M$$

wherein M is a cation and F and F' are co-ordinated monoazo dyestuffs of the formula

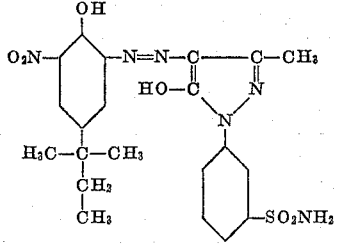

5. A complex chromium compound of the formula $$(F\!-\!Cr\!-\!F')M$$

wherein M is a cation and F and F' are co-ordinated monoazo dyestuffs of the formula

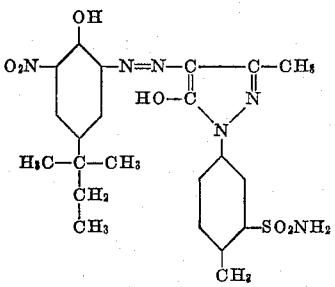

6. A complex chromium compound of the formula $$(F\!-\!Cr\!-\!F')M$$

wherein M is a cation and F is a co-ordinated monoazo dyestuff of the formula
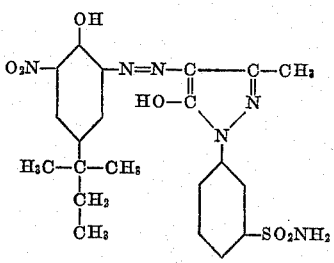
and F' is a co-ordinated monoazo dyestuff of the formula
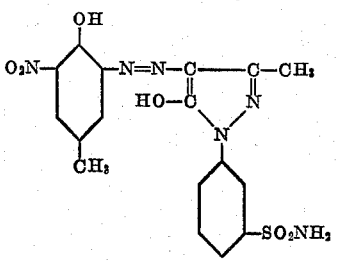
References Cited in the file of this patent
UNITED STATES PATENTS
| | | |
|---|---|---|
| 1,623,005 | Gubler et al. | Mar. 29, 1927 |
| 2,405,816 | Conzetti | Aug. 13, 1946 |
| 2,443,226 | Carson | June 15, 1948 |
| 2,464,322 | Krebser et al. | Mar. 15, 1949 |
FOREIGN PATENTS
| | | |
|---|---|---|
| 513,470 | Belgium | Feb. 12, 1953 |
OTHER REFERENCES
Venkataraman, The Chemistry of Synthetic Dyes, vol. 1, page 533 (1952).